(12) United States Patent
Muramatsu

(10) Patent No.: US 11,731,541 B2
(45) Date of Patent: Aug. 22, 2023

(54) SEAT HEATER, AND TEMPERATURE CONTROL METHOD AND TEMPERATURE CONTROL PROGRAM FOR SEAT HEATER

(71) Applicant: KURABE INDUSTRIAL CO., LTD., Hamamatsu (JP)

(72) Inventor: Kyoichi Muramatsu, Shizuoka (JP)

(73) Assignee: KURABE INDUSTRIAL CO., LTD., Hamamatsu (JP)

( * ) Notice: Subject to any disclaimer, the term of this patent is extended or adjusted under 35 U.S.C. 154(b) by 561 days.

(21) Appl. No.: 16/650,844

(22) PCT Filed: Sep. 25, 2018

(86) PCT No.: PCT/JP2018/035449
§ 371 (c)(1),
(2) Date: Mar. 25, 2020

(87) PCT Pub. No.: WO2019/065628
PCT Pub. Date: Apr. 4, 2019

(65) Prior Publication Data
US 2020/0276922 A1 Sep. 3, 2020

(30) Foreign Application Priority Data

Sep. 29, 2017 (JP) ................................. 2017-190197

(51) Int. Cl.
*B60N 2/56* (2006.01)
*G05B 13/04* (2006.01)
(Continued)

(52) U.S. Cl.
CPC ......... *B60N 2/5678* (2013.01); *G05B 13/041* (2013.01); *H05B 1/0238* (2013.01);
(Continued)

(58) Field of Classification Search
CPC .......... A47C 7/74; B60N 2/56; B60N 2/5678; G05B 13/041; H05B 1/0238;
(Continued)

(56) References Cited

U.S. PATENT DOCUMENTS 6,237,675 B1 * 5/2001 Oehring ............. B60H 1/00285
219/202

FOREIGN PATENT DOCUMENTS

JP H04073529 A 3/1992
JP H05036819 A 2/1993
(Continued)

*Primary Examiner* — Dana Ross
*Assistant Examiner* — Joseph W Iskra
(74) *Attorney, Agent, or Firm* — McCoy Russell LLP

(57) ABSTRACT

A seat heater according to the present invention includes: a heater that is provided between a seat cushioning material and a seat trim cover and includes a heating wire laid on a base material; a temperature detection unit provided in the vicinity of the heating wire of the heater; and a temperature control unit configured to control a temperature of the heater so that it approaches a target temperature, in which the temperature control unit calculates an estimated environment temperature, which is an estimated value of a temperature around the temperature detection unit, based on a rate of increase of a temperature indicating an amount of change of the temperature detected by the temperature detection unit in a period after an elapse of a predetermined time from a start of heating the heater, and corrects the target temperature so that it becomes lower as the estimated environmental temperature becomes lower.

10 Claims, 17 Drawing Sheets

(51) Int. Cl.
*H05B 1/02* (2006.01)
*H05B 3/16* (2006.01)
*H05B 3/34* (2006.01)

(52) U.S. Cl.
CPC ............... *H05B 3/16* (2013.01); *H05B 3/34* (2013.01); *H05B 2203/029* (2013.01)

(58) Field of Classification Search
CPC ........ H05B 2203/014; H05B 2203/029; H05B 3/16; H05B 3/34
USPC ........................................................ 700/300
See application file for complete search history.

(56) References Cited

FOREIGN PATENT DOCUMENTS

| | | | |
|---|---|---|---|
| JP | 2010163170 A | | 7/2010 |
| JP | 2017009946 A | | 1/2017 |
| WO | WO2017043246 | * | 8/2016 |

* cited by examiner

MEASUREMENT CONDITION
- AMBIENT TEMPERATURE OF THERMISTOR=20°C
- MEASUREMENT TIME OF RATE OF INCREASE OF TEMPERATURE
  = ONE MINUTE AFTER TEMPERATURE STARTS TO BE INCREASED

ESTIMATED ENVIRONMENTAL TEMPERATURE
CALCULATED BASED ON RESULT OF
MEASUREMENT BEFORE CORRECTION IS MADE

| POWER-SUPPLY VOLTAGE Vbat[V] | RATE OF INCREASE OF TEMPERATURE[°C/min] | ESTIMATED ENVIRONMENTAL TEMPERATURE[°C] |
|---|---|---|
| 9.0 | 10.5 | -8.4 |
| 12.0 | 17.5 | 19.8 |
| 16.0 | 30.0 | 64.0 |

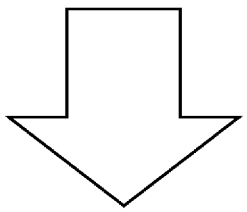

ESTIMATED ENVIRONMENTAL TEMPERATURE
CALCULATED BY PERFORMING CORRECTION PROCESSING
BASED ON SUPPLIED ELECTRIC POWER

| POWER-SUPPLY VOLTAGE Vbat[V] | RATE OF INCREASE OF TEMPERATURE[°C/min] (CORRECTED) | ESTIMATED ENVIRONMENTAL TEMPERATURE[°C] (CORRECTED) |
|---|---|---|
| 9.0 | 18.6 | 18.6 |
| 12.0 | 17.5 | 19.8 |
| 16.0 | 16.9 | 20.5 |

Fig. 17

SEAT HEATER, AND TEMPERATURE CONTROL METHOD AND TEMPERATURE CONTROL PROGRAM FOR SEAT HEATER

CROSS-REFERENCE TO RELATED APPLICATIONS

The present application is a U.S. National Phase of International Patent Application Serial No. PCT/JP2018/035449 entitled "SEAT HEATER, METHOD FOR CONTROLLING TEMPERATURE OF SEAT HEATER, AND TEMPERATURE CONTROL PROGRAM," filed on Sep. 25, 2018. International Patent Application Serial No. PCT/JP2018/035449 claims priority to Japanese Patent Application No. 2017-190197 filed on Sep. 29, 2017. The entire contents of each of the above-referenced applications are hereby incorporated by reference for all purposes.

TECHNICAL FIELD

The present invention relates to a seat heater, and a temperature control method and a temperature control program for a seat heater, and in particular, to a seat heater installed under the trim cover of a car seat, and a temperature control method and a temperature control program therefor.

BACKGROUND ART

In recent years, cases in which heaters are provided in automobile seats have been increasing. Such a heater is provided between the seat cushioning material of the automobile seat and the trim cover thereof. Further, such a heater is referred to as a seat heater. In a seat heater, in order to provide comfort for a person who is seated, a temperature is controlled so as to be a specified predetermined temperature. Patent Literature 1 to 4 disclose examples of such a method for controlling the temperature of the heater.

In Patent Literature 1 to 4, the temperature of an object to be heated is detected by a temperature detector or the like, the temperature of the object to be heated is estimated from the detected temperature, and the temperature of the object to be heated is controlled based on the estimated temperature.

CITATION LIST

Patent Literature

Patent Literature 1: Japanese Unexamined Patent Application Publication No. 2010-163170
Patent Literature 2: Japanese Unexamined Patent Application Publication No. 2017-9946
Patent Literature 3: Japanese Unexamined Patent Application Publication No. H05-036819
Patent Literature 4: Japanese Unexamined Patent Application Publication No. H04-073529

SUMMARY OF INVENTION

Technical Problem

However, in a seat heater, in accordance with the ambient temperature of the temperature detector, a deviation constantly occurs between the temperature of the heater that is an actual object to be heated or the temperature of the seat trim cover and the temperature detected by the temperature detector. Therefore, even if the temperature of the object to be heated is estimated from the temperature detected by the temperature detector as in the techniques disclosed in Patent Literature 1 to 4, the temperature deviation due to the ambient temperature of the temperature detector cannot be eliminated. This causes a problem that an error between the temperature of the seat trim cover and a target temperature increases. That is, even if the techniques disclosed in Patent Literature 1 to 4 are used, a problem that the accuracy of control of the temperature of the seat trim cover cannot be increased in the seat heater occurs.

Solution to Problem

One aspect of a seat heater according to the present invention is a seat heater including: a heater that is provided between a seat cushioning material and a seat trim cover and includes a heating wire laid on a base material; a temperature detection unit provided on the base material and in the vicinity of the heating wire of the heater; and a temperature control unit configured to control a temperature of the heater so that it approaches a target temperature in accordance with a temperature detected by the temperature detection unit, in which the temperature control unit calculates an estimated environmental temperature, which is an estimated value of a temperature around the temperature detection unit, based on a rate of increase of the temperature detected by the temperature detection unit in a period after an elapse of a predetermined time from a start of heating the heater, and corrects the target temperature so that it becomes lower as the estimated environmental temperature becomes lower.

A temperature control method for a seat heater according to the present invention is a temperature control method for a seat heater including a heater that is provided between a seat cushioning material and a seat trim cover and includes a heating wire laid on a base material and a temperature detection unit provided on the base material and in the vicinity of the heating wire of the heater, the temperature control method including: starting heating the seat heater at a target temperature corresponding to an initial temperature detected by the temperature detection unit at a start of heating the heater, acquiring a rate of increase of a temperature detected by the temperature detection unit in a period after an elapse of a predetermined time from the start of heating the heater; calculating, based on the rate of increase of the temperature, an estimated environmental temperature that is an estimated value of a temperature around the temperature detection unit; correcting the target temperature so that it becomes lower as the estimated environmental temperature becomes lower; and controlling a temperature of the heater by switching the target temperature of the heater to the corrected target temperature when the corrected target temperature is determined.

One aspect of a temperature control program according to the present invention is a temperature control program performed in a seat heater including a heater that is provided between a seat cushioning material and a seat trim cover and includes a heating wire laid on a base material, a temperature detection unit provided on the base material and in the vicinity of the heating wire of the heater, and a temperature control unit configured to control a temperature of the heater, the temperature control program causing the temperature control unit to: start heating the seat heater at a target temperature corresponding to an initial temperature detected by the temperature detection unit at a start of heating the heater, acquire a rate of increase of a temperature detected by the temperature detection unit in a period after an elapse of a predetermined time from the start of heating the heater;

calculate, based on the rate of increase of the temperature, an estimated environmental temperature that is an estimated value of a temperature around the temperature detection unit; correct the target temperature so that it becomes lower as the estimated environmental temperature becomes lower; and control a temperature of the heater by switching the target temperature of the heater to the corrected target temperature when the corrected target temperature is determined.

Advantageous Effects of Invention

The seat heater, and the temperature control method and the temperature control program of the seat heater according to the present invention make it possible to control the temperature of the seat trim cover with high accuracy.

BRIEF DESCRIPTION OF DRAWINGS

FIG. 17 is a table showing a relation between fluctuations in a power-supply voltage and an estimated environmental temperature according to the fifth embodiment.

DESCRIPTION OF EMBODIMENTS

First Embodiment

Figure 1:
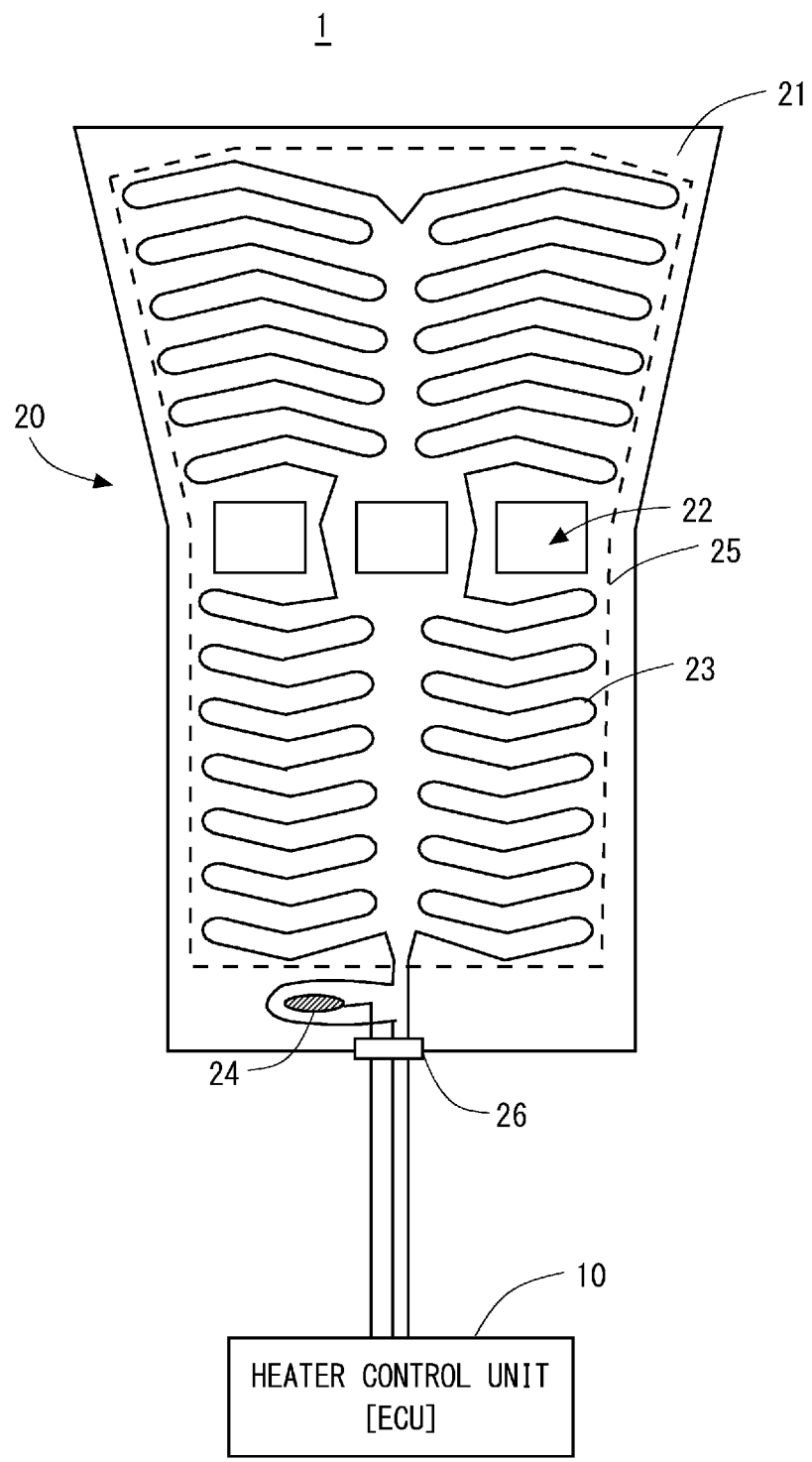
FIG. 1 is a schematic diagram of a seat heater according to a first embodiment.

The following descriptions and drawings are omitted and simplified as appropriate for the sake of clarity of the descriptions. Further, each element shown in the drawings as functional blocks that perform various processing can be formed of a CPU, a memory, and other circuits in hardware and may be implemented by programs loaded into the memory in software. Those skilled in the art will therefore understand that these functional blocks may be implemented in various ways by only hardware, only software, or the combination thereof without any limitation. Note that throughout the drawings, the same components are denoted by the same reference signs and repeated descriptions will be omitted as appropriate.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

FIG. 1 shows a schematic diagram of a seat heater 1 according to a first embodiment. As shown in FIG. 1, the seat heater 1 according to the first embodiment includes a temperature control unit (e.g., a heater control unit 10) and a heater 20. The heater 20 includes a base material 21, a heating wire 23, a temperature detection unit (e.g., a thermistor 24), and an outlet 26. Note that the example in FIG. 1 shows a case in which an opening 22 is provided in the base material 21. The opening 22 is a hole through which a metal fitting for connecting the seat trim cover to the frame of the car seat is passed.

The heater 20 includes the heating wire 23 laid on the base material 21. Further, in the heater 20, the area where the heating wire 23 is laid on the base material 21 is an area where a person who is seated sits on the seat. FIG. 1 shows a seating part 25 of the heater 20. Further, the thermistor 24 is provided on the base material 21 and in the vicinity of the heating wire of the heater. The thermistor 24 is more preferably provided near the outer periphery of the heater 20. The example in FIG. 1 shows a case in which the thermistor 24 is provided between the seating part 25 and the outlet 26 through which the heating wire 23 is drawn to the heater control unit 10. Further, it is preferred that a heat transfer wire be laid around the thermistor 24 in order to transmit heat to the thermistor 24. Note that the thermistor 24 may be provided in the seating part 25, but it is preferably provided at a position shifted from the seating position. This is because the thermistor 24 is harder than the base material 21 and the heating wire 23, so that the thermistor 24 may not only make a person who is seated uncomfortable but it also may not be able to sufficiently function if it is located at the seating position.

Figure 2:
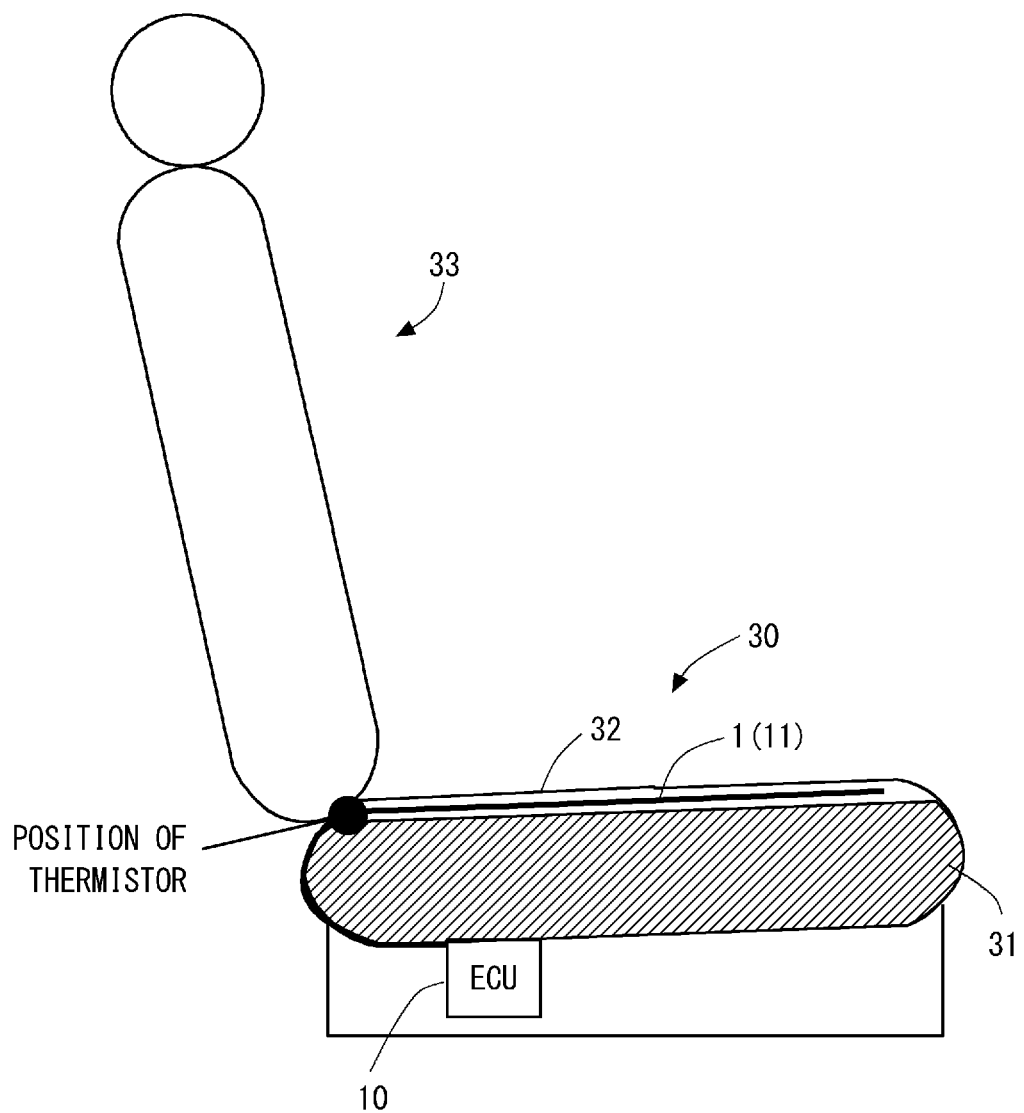
FIG. 2 is a schematic diagram of an automobile seat according to the first embodiment.

The seat heater 1 according to the first embodiment is provided on the seat surface of an automobile seat. FIG. 2 shows a schematic diagram of the automobile seat according to the first embodiment. As shown in FIG. 2, the automobile seat includes a seat surface 30 and a backrest 33. Further, a seat trim cover 32 is provided on the seat surface 30 so that it wraps a seat cushioning material 31. Further, the heater 20 of the seat heater 1 is provided between the seat cushioning material 31 and the seat trim cover 32. Further, the thermistor 24 of the seat heater 1 is provided at a position shifted from the seating position of a person who is seated, for example, in the vicinity of the part connecting the seat surface 30 to the backrest 33. Further, for example, the heater control unit 10 is provided on the rear surface side of the seat surface 30 and is connected thereto by a lead wire.

Figure 3:
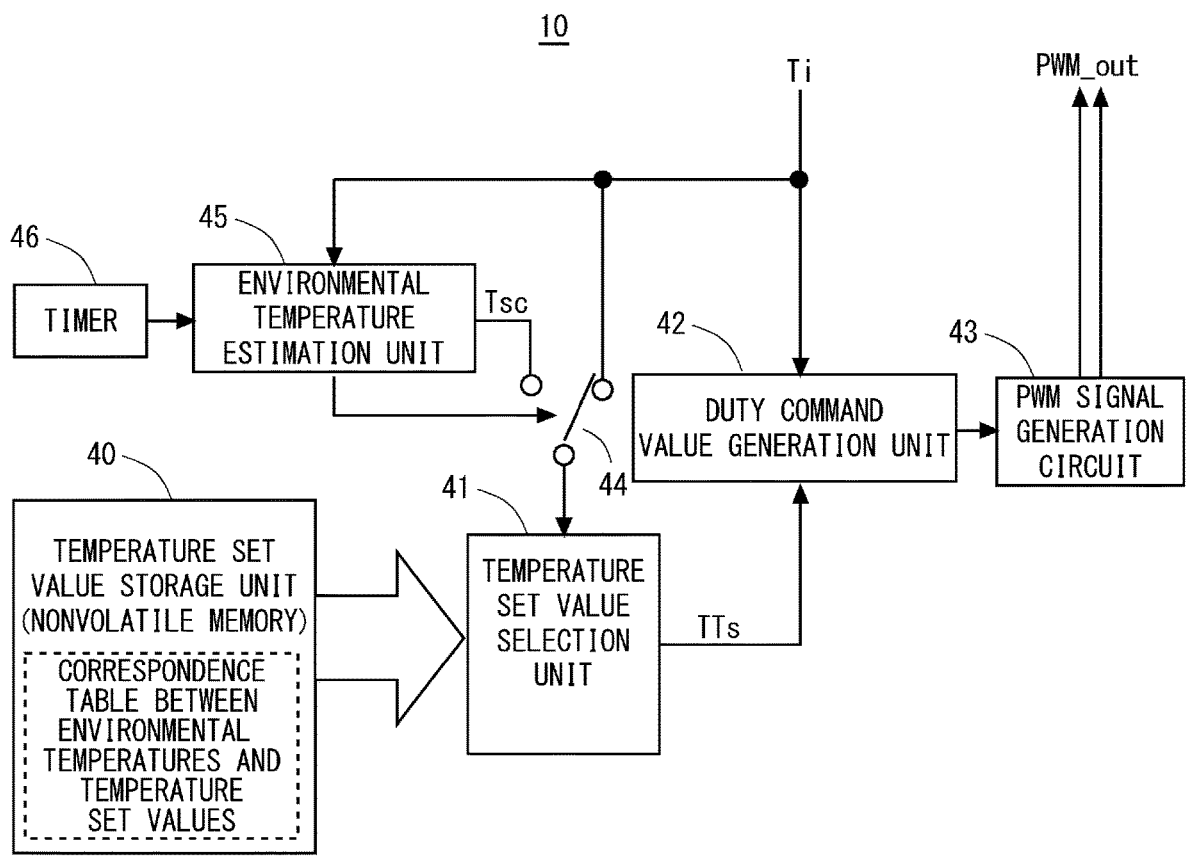
FIG. 3 is a block diagram of a temperature control unit according to the first embodiment.

One of the features of the seat heater 1 according to the first embodiment is a temperature control method performed by the heater control unit 10. Therefore, in the following description, the temperature control method performed by the heater control unit 10 is explained in detail. First, FIG. 3 shows a block diagram of the temperature control unit 10 according to the first embodiment. As shown in FIG. 3, the heater control unit 10 includes a temperature set value storage unit 40, a temperature set value selection unit 41, a duty command value generation unit 42, a PWM signal generation circuit 43, a switch 44, an environmental temperature estimation unit 45, and a timer 46. Note that the heater control unit 10 can also be implemented by a microcomputer that can exhibit the same function as the block configuration shown in FIG. 3 and that can execute a program. When a microcomputer is used as the heater control unit 10, the functions of the temperature set value selection unit 41 and the environmental temperature estimation unit 45 are implemented by a program. Other functions may be implemented as hardware functions that are incorporated into the microcomputer.

The temperature set value storage unit 40 is, for example, a nonvolatile memory such as a flash memory. The temperature set value storage unit 40 stores a correspondence table between environmental temperatures and temperature set values. In this correspondence table, for example, address values correspond to the respective values of the environmental temperatures, and temperature set values corresponding to the environmental temperatures are stored in the addresses corresponding to the environmental temperatures. Note that in the heater control unit 10 according to the first embodiment, a correspondence table is created so that the temperature set value which specifies a higher temperature as the environmental temperature becomes lower is used.

The temperature set value selection unit 41 reads the temperature set value from the temperature set value storage unit 40 based on the environmental temperature value provided via the switch 44, and provides the read temperature set value to the duty command value generation unit 42 as a target temperature set value TTs.

The duty command value generation unit 42 adjusts the duty ratio of an output signal PWM_out output from the PWM signal generation circuit 43 so that the difference between the target temperature set value TTs and a detected environmental temperature Ti becomes smaller. Note that the detected environmental temperature Ti is a value of the temperature detected by the thermistor 24. Further, the duty command value generation unit 42 outputs a duty ratio command value that specifies the duty ratio of the output signal PWM_out output from the PWM signal generation circuit 43. The PWM signal generation circuit 43 varies the duty ratio of the output signal PWM_out based on the duty ratio command value received from the duty command value generation unit 42. The output signal PWM_out is a driving signal provided to the heating wire 23 and is a Pulse Width Modulation (PWM) signal.

The switch 44 selects one of the detected environmental temperature Ti and an estimated environmental temperature Tc in accordance with a switching signal output from the environmental temperature estimation unit 45 and provides the selected temperature value to the temperature set value selection unit 41. The environmental temperature estimation unit 45 switches the signal level of the switching signal when the calculation of the estimated environmental temperature Tc is completed, and the switch 44 changes the temperature value to be selected when the signal level of the switching signal is switched.

The timer 46 measures the time from when the heater control unit 10 starts control for increasing the temperature of the heater 20 to when a predetermined period (e.g., a measurement period of the environmental temperature) has elapsed. Further, the timer 46 notifies the environmental temperature estimation unit 45 that the measurement period of the environmental temperature has elapsed after the temperature starts to be increased.

The environmental temperature estimation unit 45 calculates the estimated environmental temperature Tc using the environmental temperature Ti (e.g., the initial environmental temperature) measured by the thermistor 24 at the timing when the heater control unit 10 starts to increase the temperature and the environmental temperature Ti measured by the thermistor 24 at the timing when the measurement period of the environmental temperature is ended. More specifically, the environmental temperature estimation unit 45 calculates an estimated environmental temperature that is an estimated value of the temperature around the thermistor 24 based on the rate of increase of the temperature detected by the thermistor 24 in the period after the elapse of a predetermined time (e.g., the measurement period of the environmental temperature) from the start of heating the heater 20. A method for calculating an estimated environmental temperature performed by the environment temperature estimation unit 45 will be described later in more detail.

Figure 4:
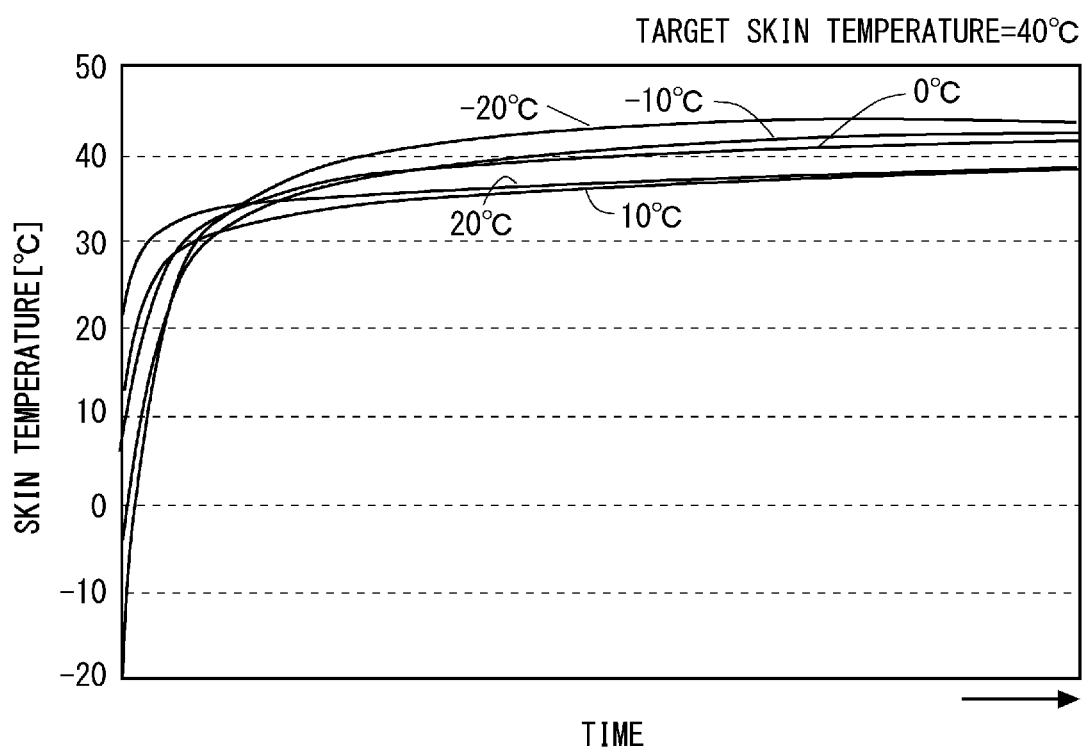
FIG. 4 is a graph for explaining a transition of the temperature of a trim cover of the automobile seat when the temperature is not controlled depending on an environmental temperature.

Next, controlling the temperature of the automobile seat according to the first embodiment will be described in detail. First, a transition of the temperature of the seat trim cover of the automobile seat when the temperature of the heater 20 according to the first embodiment is not controlled is described. FIG. 4 shows a graph for explaining the transition of the temperature of the trim cover of the automobile seat when the temperature is not controlled depending on the environmental temperature. The graph in FIG. 4 graphically shows the transition of the temperature of the seat trim cover for each environmental temperature around the thermistor 24. As shown in FIG. 4, when the temperature is not controlled depending on the environmental temperature, that is, when the temperature of the heater 20 is controlled based on a fixed target temperature, the temperature of the seat trim cover varies widely.

When the environmental temperature around the thermistor 24 is low, a large amount of heat is absorbed by the seat cushioning material that is hardly heated such as urethane, and the temperature detected by the thermistor 24 is less likely to increase compared to the temperature of the seat trim cover. Accordingly, in a case in which control is performed at a fixed target temperature, when the environmental temperature of the thermistor 24 is low, the temperature of the seat trim cover tends to be higher than the target temperature. On the other hand, when the environmental temperature around the thermistor 24 is high, a small amount of heat is absorbed by the seat cushioning material, and the temperature detected by the thermistor 24 is likely to increase compared to the temperature of the seat trim cover. Accordingly, in a case in which control is performed at a fixed target temperature, when the environmental temperature of the thermistor 24 is high, the temperature of the seat trim cover tends to be lower than the target temperature. Therefore, when the temperature is not controlled depending on the environmental temperature, variations in the temperature of the seat trim cover increase.

Figure 5:
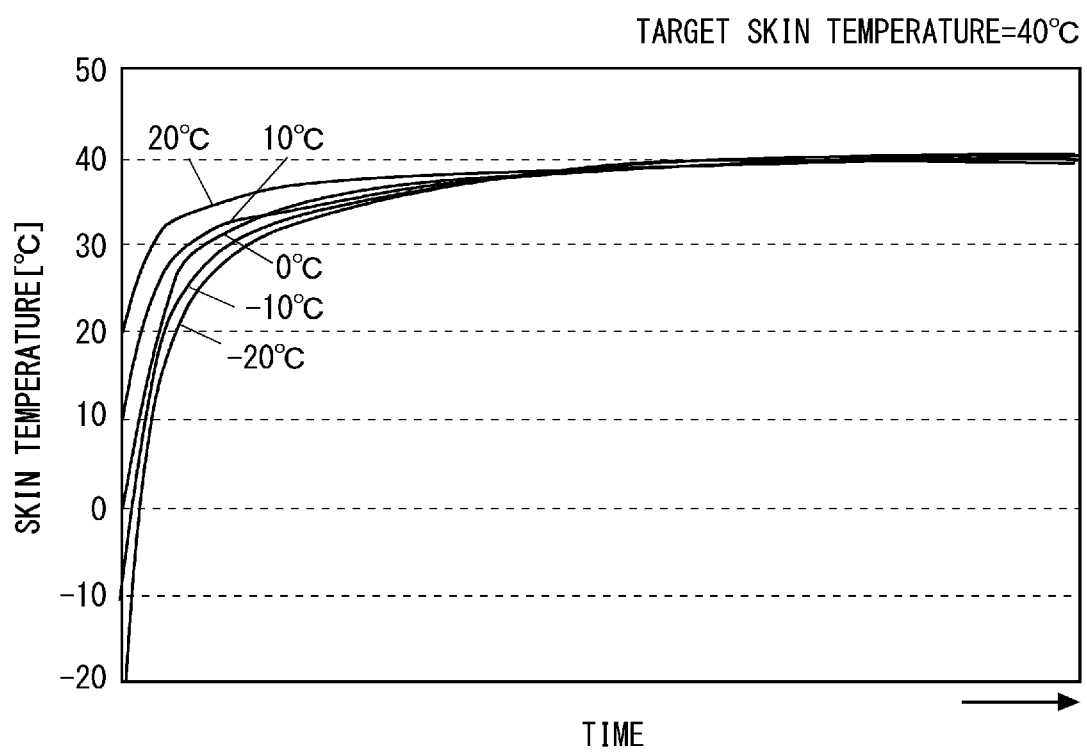
FIG. 5 is a graph for explaining the transition of the temperature of the trim cover of the automobile seat in the seat heater according to the first embodiment.

Next, a transition of the temperature of the seat trim cover of the automobile seat when the temperature of the heater 20 according to the first embodiment is controlled is described. FIG. 5 shows a graph for explaining the transition of the temperature of the trim cover of the automobile seat in the seat heater according to the first embodiment. The graph in FIG. 5 graphically shows the transition of the temperature of the seat trim cover for each environmental temperature around the thermistor 24. As shown in FIG. 5, when a temperature is controlled according to the first embodiment, that is, when a temperature of the heater 20 is controlled using a target temperature different from the temperature based on a fixed environmental temperature, variations in the temperature of the seat trim cover are reduced.

Figure 6:
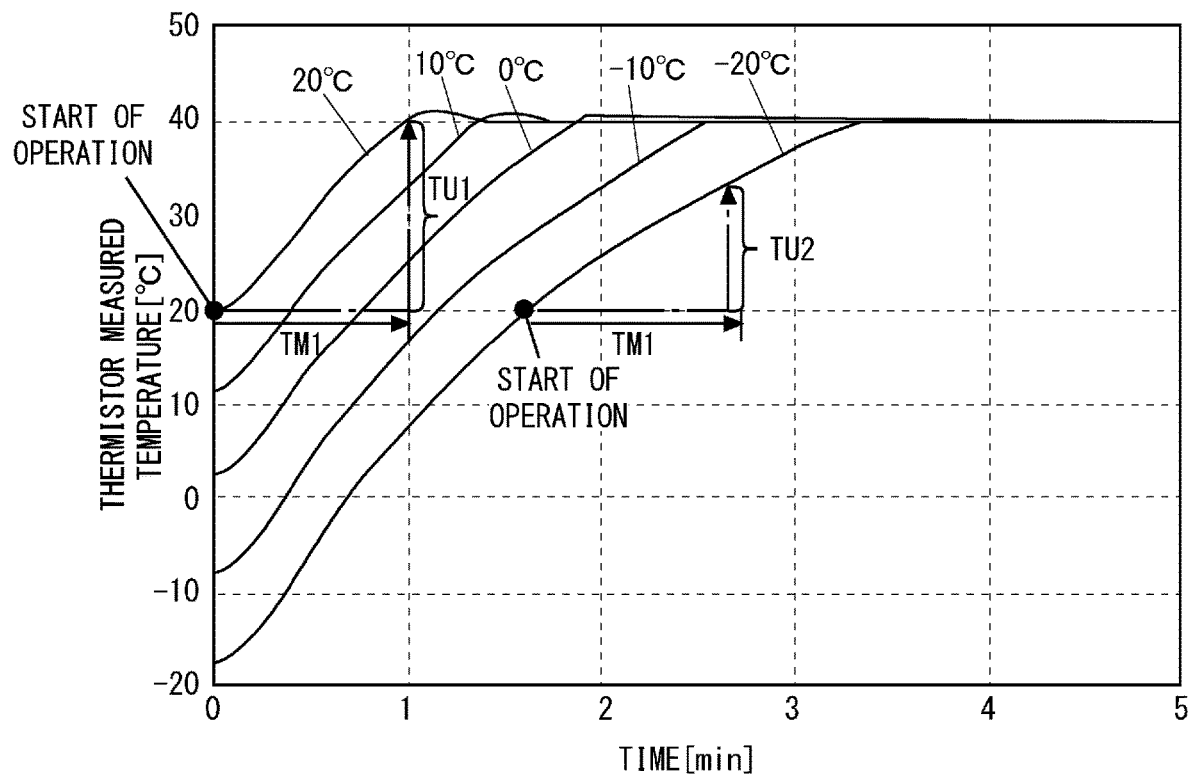
FIG. 6 is a graph for explaining a relation between a change in a thermistor measured temperature and the environmental temperature.

In the control of the temperature of the heater 20 according to the first embodiment, the environmental temperature Ti detected by the thermistor 24 is not used as it is, the original environmental temperature is estimated from the environmental temperature Ti detected by the thermistor 24, and a target temperature is set based on the estimated environmental temperature, thereby enabling the above-described control of the temperature that reduces variations. Therefore, an environmental temperature dependence of the temperature detected by the thermistor 24 is described. FIG. 6 shows a graph for explaining a relation between a change in a thermistor measured temperature and the environmental temperature. Note that FIG. 6 shows a graph of the change of the temperature detected by the thermistor for each environmental temperature.

As shown in FIG. 6, the rate of increase of the temperature detected by the thermistor 24 tends to become lower as the environmental temperature becomes lower. In the control of the temperature according to the first embodiment, this rate of increase is focused, and the environmental temperature is estimated from the rate of increase of the temperature acquired by the thermistor.

Further, in an automobile, for example, turning off the ignition for a short time and then turning on the ignition again is frequently performed. In such a case, the temperature of the thermistor 24 may not be reduced to the original environmental temperature and remain higher than the environmental temperature. In this case, if the temperature acquired by the thermistor 24 at the start of controlling the temperature of the heater 20 is used as an environmental temperature, the temperature is controlled based on a target temperature corresponding to the environmental temperature higher than the original environmental temperature, and the temperature of the seat trim cover deviates from the original target temperature. However, as shown in FIG. 6, in the control of the temperature according to the first embodiment, even when the start temperature of 20° C. is detected by the thermistor 24 at the environmental temperature of −20° C., the rate of increase of the environmental temperature of −20° C. can be acquired. This makes it possible to set a target temperature corresponding to the environmental temperature of −20° C. based on the aforementioned rate of increase.

Figure 7:
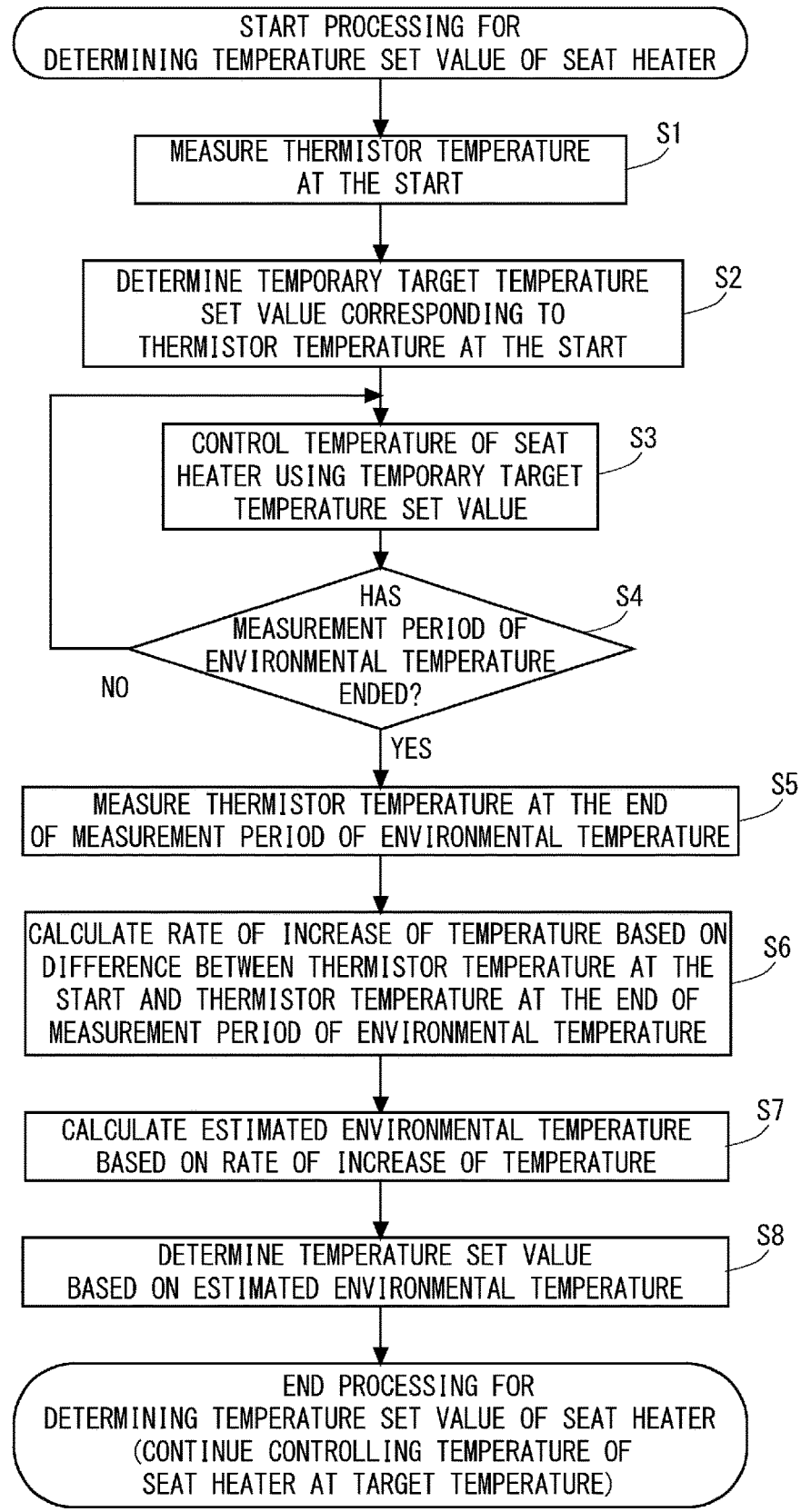
FIG. 7 is a flowchart for explaining a processing procedure for controlling the temperature in the seat heater according to the first embodiment.

Next, the procedure for controlling the temperature of the heater 20 according to the first embodiment is described. FIG. 7 shows a flowchart for explaining a processing procedure for controlling the temperature in the seat heater according to the first embodiment. Note that the control shown in FIG. 7 is performed by the heater control unit 10.

As shown in FIG. 7, when the heater control unit 10 according to the first embodiment starts the processing for determining a temperature set value of the heater 20, the heater control unit 10 firstly measures the temperature of the thermistor 24 at the start (Step S1). Then, the temperature set value selection unit 41 of the heater control unit 10 reads the temperature set value corresponding to the detected environmental temperature Ti detected in Step S1 from the temperature set value storage unit 40, and determines the read temperature set value as a temporary target temperature set value (Step S2). After that, the duty command value generation unit 42 and the PWM signal generation circuit 43 control the temperature of the heater 20 based on the temporary target temperature set value determined by the temperature set value selection unit 41 (Step S3). The control of the temperature in Step S3 is performed until the measurement period of the environmental temperature ends (Step S4).

When the measurement period of the environmental temperature has ended, the environmental temperature estimation unit 45 again acquires the detected environmental temperature Ti detected by the thermistor 24 (Step S5). The environmental temperature estimation unit 45 calculates a rate of increase of the temperature based on the detected environmental temperature Ti acquired in Step S5 and the detected environmental temperature Ti acquired in Step S1 (Step S6). Further, the environmental temperature estimation unit 45 calculates an estimated environmental temperature Tc using the rate of increase of the temperature calculated in Step S6 (Step S7). Note that the heater control unit 10 according to the first embodiment also uses the environmental temperature Ti acquired in Step S1 in the processing for calculating the estimated environmental temperature Tc in Step S7. By doing so, the heater control unit 10 according to the first embodiment increases the accuracy of estimation of the estimated environment temperature Tc.

After that, the environmental temperature estimation unit 45 switches the logic level of the switching signal to be provided to the switch 44, thereby switching the value of the environmental temperature provided to the temperature set value selection unit 41 from the detected environmental temperature Ti to the estimated environmental temperature Tc. By doing so, the temperature set value selection unit 41 selects a temperature set value corresponding to the estimated environmental temperature Tc, so that it is determined that the target temperature of the duty command value generation unit 42 is a temperature (e.g., the temperature set value) corresponding to the estimated environmental temperature Tc (Step S8). Accordingly, the processing for determining the temperature set value of the heater 20 is completed, and the heater control unit 10 continues controlling the temperature of the heater 20 based on the temperature set value.

Figure 8:
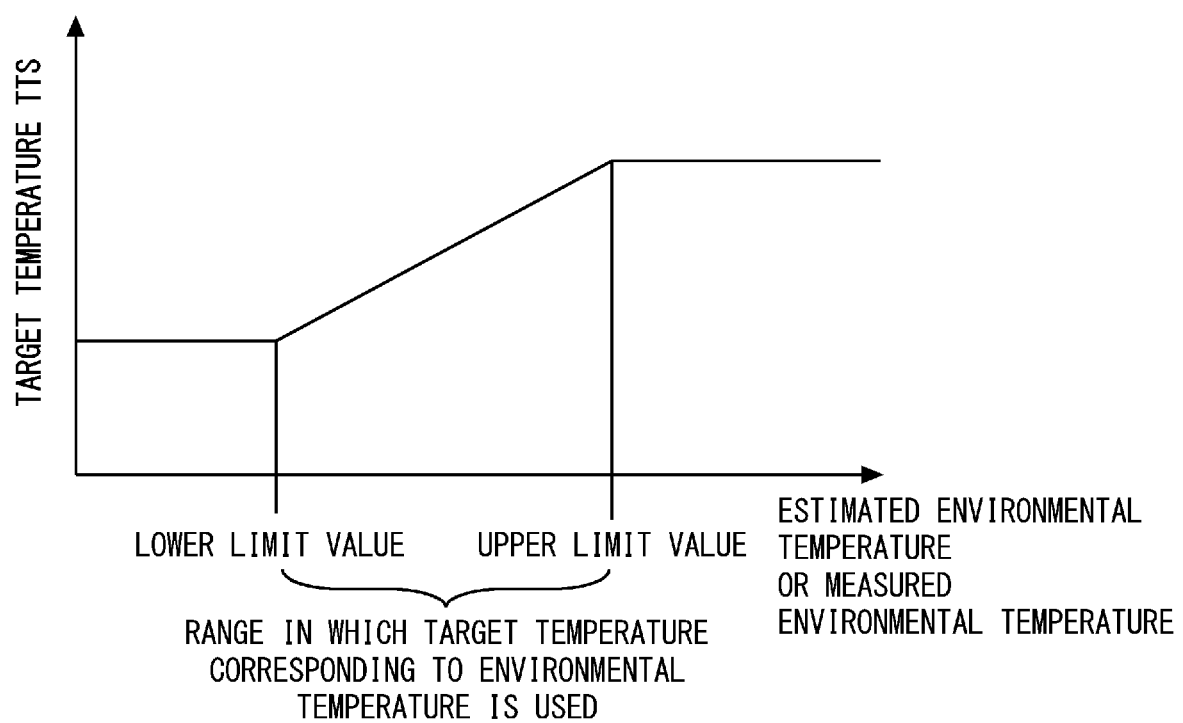
FIG. 8 is a graph for explaining a variable range of a target temperature in the seat heater according to the first embodiment.

A characteristic part of the control procedure shown in FIG. 7 is described below in more detail. First, in the heater control unit 10 according to the first embodiment, a certain range is provided for a temperature calculated as an estimated environmental temperature that uses a value different from the temperature as a target temperature or for the environmental temperature (the measured environmental temperature) measured by the thermistor 24. FIG. 8 shows a graph for explaining a variable range of the target temperature in the seat heater according to the first embodiment.

As shown in FIG. 8, in the heater control unit 10 according to the first embodiment, an upper limit value and a lower limit value are provided for the estimated environmental temperature or the measured environmental temperature. Further, for an estimated environmental temperature or a measured environmental temperature between the upper limit value and the lower limit value, a target temperature having a value different from the value of the temperature is used. On the other hand, for the estimated environmental temperature or the measured environmental temperature that is equal to or higher than the upper limit value or lower than the lower limit value, a preset target temperature is used. Accordingly, in the heater control unit 10 according to the first embodiment, it is possible to reduce the amount of calculation.

Figure 9:
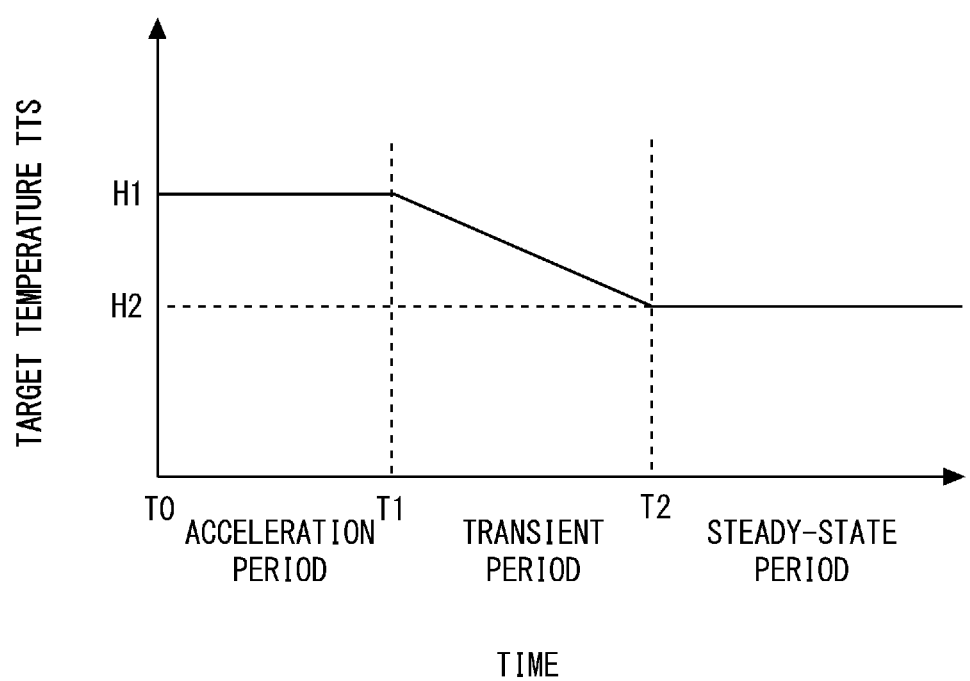
FIG. 9 is a graph for explaining a switching of control of the temperature in the seat heater according to the first embodiment.

Next, the measurement time of the environmental temperature is described. For the measurement period of the environmental temperature, a period during an acceleration period, in which the heater 20 is driven with an output of 100% to accelerate the increase of the temperature of the heater 20, is used in order to improve the accuracy of the rate of increase of the temperature. FIG. 9 shows a graph for explaining a switching of control of the temperature in the seat heater according to the first embodiment.

As shown in FIG. 9, the heater control unit 10 according to the first embodiment drives the heater 20 with an output of 100% until a time T1 elapses after the temperature of the heater 20 starts to be increased, which is an acceleration period. A target temperature H1 during this acceleration period is, for example, a temporary target temperature corresponding to the measured environmental temperature measured when the heater control unit 10 starts controlling the temperature of the heater 20, or a target temperature at which the heater control unit 10 can perform an output of 100%. The period until a time T2 elapses after the time T1 elapses is a transient period during which the control shifts to a control in accordance with a target temperature H2 that is set based on the estimated environmental temperature. Further, the period after the time T2 elapses is a steady-state period in which a control in accordance with the target temperature H2 is performed.

It should be noted that the time during which the heater control unit 10 performs an output of 100% in the acceleration period may be shorter than the preset measurement period of the environmental temperature due to the difference between the thermistor temperature and the target temperature H1. In such a case, the heater control unit 10 according to the first embodiment calculates, as a converted amount of change of the temperature, the amount of change of the temperature that will be acquired during the length of the preset measurement period of the environmental temperature from the acquired amount of change of the temperature, and calculates the rate of increase of the temperature based on the calculated converted amount of change of the temperature. By doing so, the heater control unit 10 according to the first embodiment can acquire the rate of increase of the temperature based on the amount of change of the temperature measured in the period of a fixed length even when the acceleration period becomes short.

Figure 10:
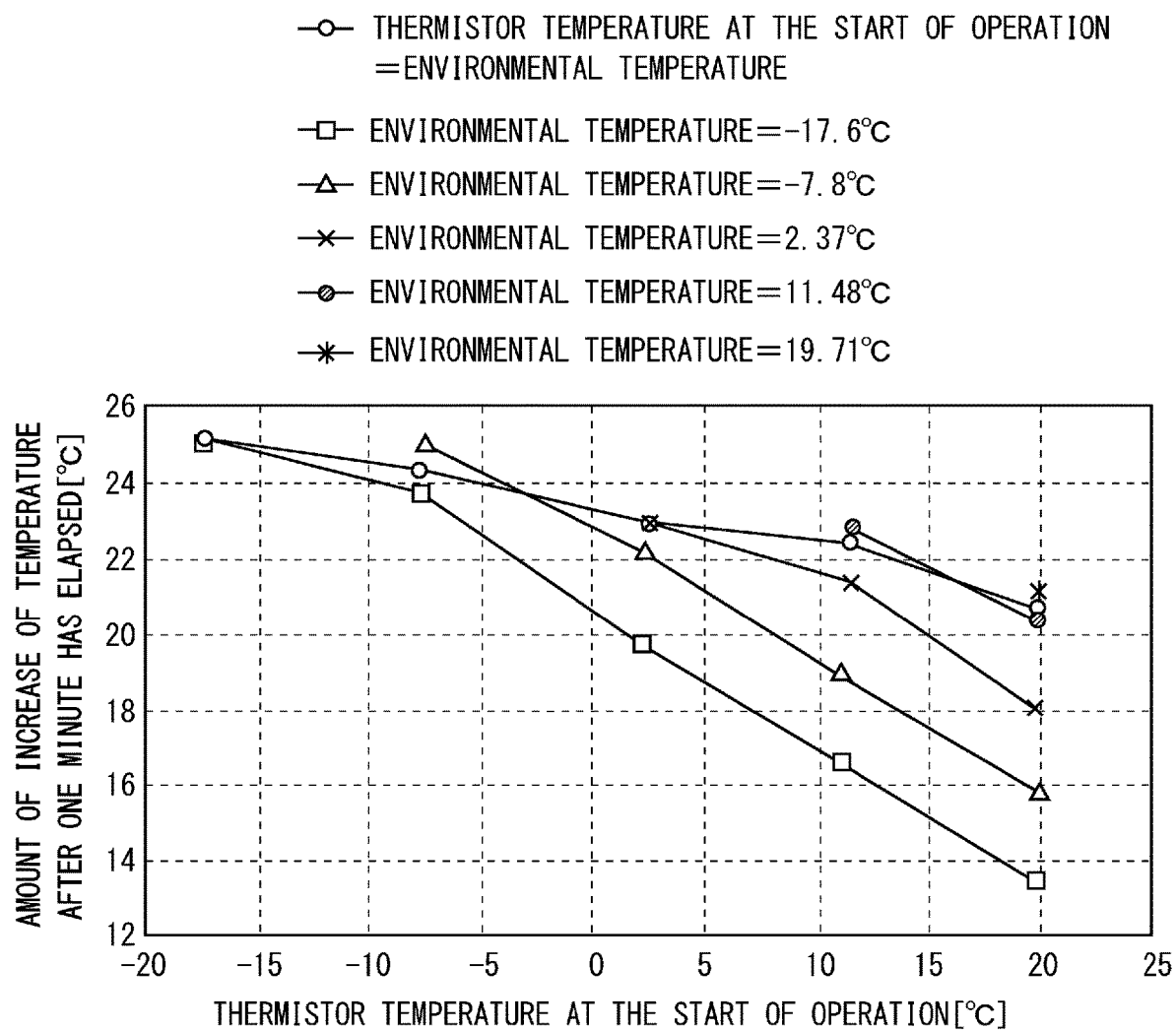
FIG. 10 is a graph for explaining a relation, in the seat heater according to the first embodiment, between the environmental temperature, and the amount of change of the temperature during a measurement period of the environmental temperature.

Next, the method for calculating an estimated environmental temperature performed by the heater control unit 10 according to the first embodiment is described in detail. First, FIG. 10 shows a graph for explaining, in the seat heater according to the first embodiment, a relation between the environmental temperature, and the amount of change of the temperature during a measurement period of the environmental temperature. The graph in FIG. 10 graphically shows the amount of change of the environmental temperature Ti acquired when a time of one minute is set as the measurement period of the environmental temperature for each environmental temperature. As shown in FIG. 10, a fixed relation between the amount of change of the environmental temperature Ti and the measured environmental temperature acquired from the thermistor 24 at the start of operation can be seen.

Figure 11:
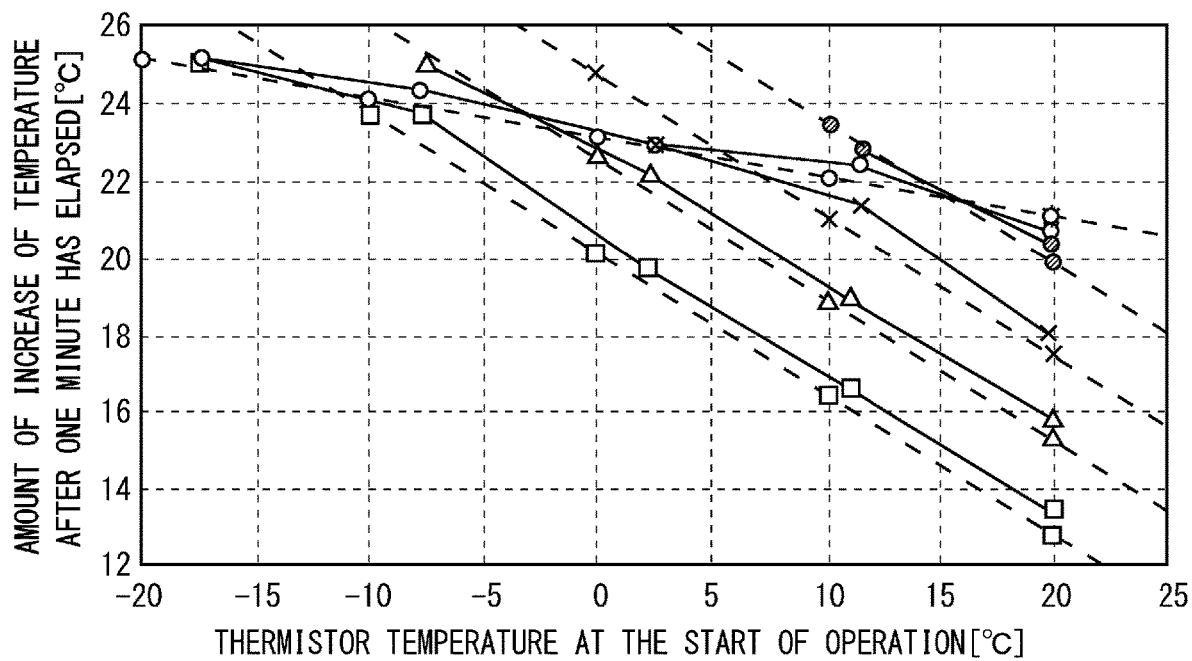
FIG. 11 is a graph for explaining an approximate straight line used for estimating the environmental temperature in the seat heater according to the first embodiment.

Therefore, in the heater control unit 10 according to the first embodiment, an approximate straight line is acquired in advance from the graph shown in FIG. 10 and an estimated environmental temperature is calculated by using a calculation formula calculated from the graph using the approximate straight line. FIG. 11 shows a graph for explaining an approximate straight line used for estimating the environmental temperature in the seat heater according to the first embodiment. As shown in FIG. 11, the approximate straight line used for calculating an estimated environmental temperature is acquired as a straight line having a fixed approximate amount with respect to the result of measurement.

Figure 12:
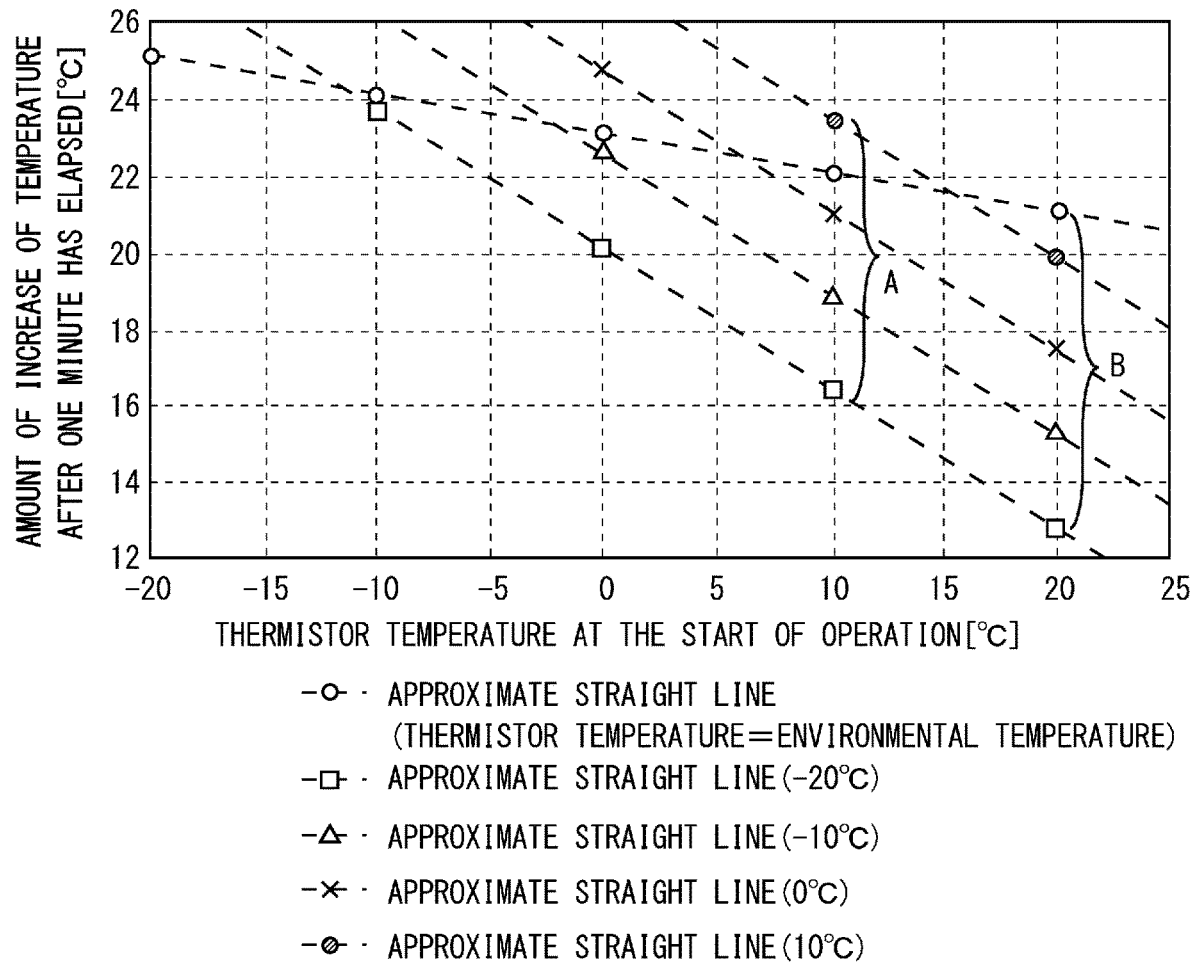
FIG. 12 is a graph for explaining a method for estimating the environmental temperature in the seat heater according to the first embodiment.

Next, FIG. 12 shows a graph for explaining a method for estimating the environmental temperature in the seat heater according to the first embodiment. As shown in FIG. 12, the heater control unit 10 according to the first embodiment creates a calculation formula for each measured environmental temperature acquired from the thermistor 24 at the start of operation. As a specific example, FIG. 12 shows an example of creating a calculation formula for calculating an estimated environmental temperature using the amount of change of the temperature in a range A as a variable when the measured environmental temperature at the start of the operation is 10° C. and creating a calculation formula for calculating an estimated environmental temperature using the amount of change of the temperature in a range B as a variable when the measured environmental temperature at the start of the operation is 10° C. By using the above calculation formulas, if the amount of change of the temperature acquired when the measured environmental temperature at the start of operation is 10° C. is about 19° C., the estimated environmental temperature of −10° C. is acquired.

Further, even if the acquired amount of change of the temperature is, for example, an intermediate value between the amount of change of the temperature corresponding to −10° C. and the amount of change of the temperature corresponding to 0° C., it is possible to calculate an estimated environmental temperature of, for example, −5° C. by using the aforementioned formulas.

Note that in the calculation of the estimated environmental temperature, when the environmental temperature to be measured and the amount of change of the temperature are each multiplied by 100, it is possible to perform calculation up to the value in the second decimal place of each temperature by integer arithmetic.

As described above, in the seat heater 1 and the control method therefor according to the first embodiment, an estimated environmental temperature is calculated by estimating the environmental temperature of the thermistor 24 based on the rate of increase of the temperature of the thermistor from when the temperature of the heater 20 starts to be increased to when a certain period of time has elapsed, and a target temperature corresponding to the estimated environmental temperature is set. Accordingly, the seat heater 1 and the control method therefor according to the first embodiment make it possible to perform control of the temperature with higher accuracy than when a target temperature is set only based on the measured temperature acquired from the thermistor 24.

Further, the seat heater 1 and the control method therefor according to the first embodiment make it possible to enhance the accuracy of control of the temperature even if there is a difference between the measured environmental temperature acquired from the thermistor 24 and the actual environmental temperature.

Further, as shown in FIG. 6, the increase of the temperature of the thermistor 24 draws a complicated curve that is shifted from a straight line. Therefore, the seat heater 1 and the control method therefor according to the first embodiment use a calculation formula in which the measured environmental temperature when the temperature of the heater 20 starts to be increased is taken into consideration. By doing so, in the seat heater 1 and the control method therefor according to the first embodiment, it is possible to increase the accuracy of the estimated environment temperature and the target temperature.

Second Embodiment

Figure 13:
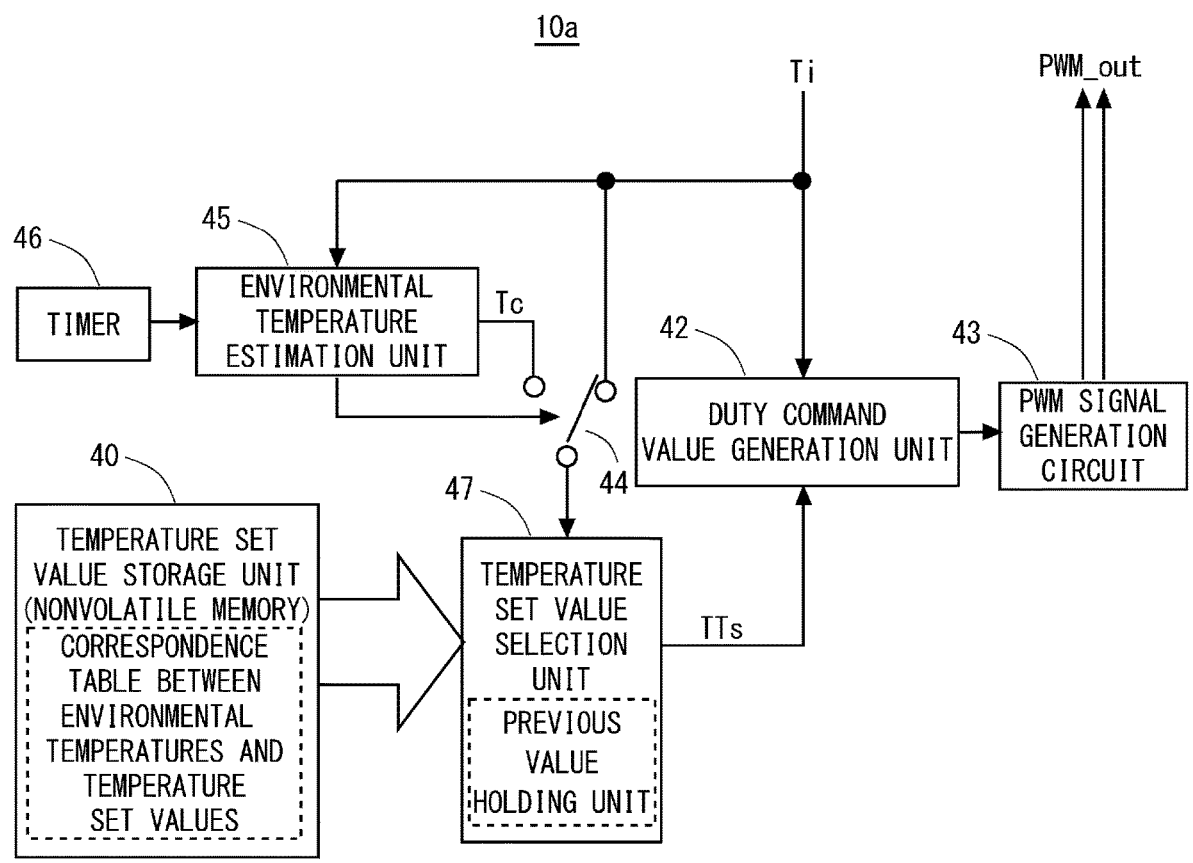
FIG. 13 is a block diagram of a temperature control unit according to a second embodiment.

In a second embodiment, a heater control unit (e.g., a heater control unit 10a), which is a modified example of the heater control unit 10 according to the first embodiment, will be described. FIG. 13 shows a block diagram of the heater control unit 10a according to the second embodiment. As shown in FIG. 13, the configuration of the heater control unit 10a according to the second embodiment is the same as that of the heater control unit 10 according to the first embodiment except that the temperature set value selection unit 41 is replaced with a temperature set value selection unit 47.

The temperature set value selection unit 47 is the same as the temperature set value selection unit 41 except that a previous value holding unit is included. In the temperature set value selection unit 47, for example, the previous value holding unit holds, at the timing of transition to an operation stop state of the seat heater 1 such as an ignition-off state, the temperature set value selected at that point in time.

Then, the temperature set value selection unit 47 compares, at the start of the next operation of heating of the heater 20, the value of the previous value holding unit with the temperature set value corresponding to the detected environment temperature Ti measured by the thermistor 24 at that time, and selects a temperature set value at which an acceleration control is completed in a short time or a temperature set value at which an acceleration control satisfies the length of the measurement period of the envi-ronmental temperature.

By using the heater control unit 10a according to the second embodiment, it is possible to appropriately perform an acceleration control compared to using a temperature set value corresponding to the measurement environment temperature acquired when the temperature of the heater 20 starts to be increased. For example, by using the heater control unit 10a according to the second embodiment, it is possible to reduce the time for an acceleration control compared to that in the first embodiment, or to obtain such an effect as to increase the accuracy of the rate of increase of the temperature by securing a time for an acceleration control that satisfies the length of the measurement period of the environmental temperature.

Third Embodiment

Figure 14:
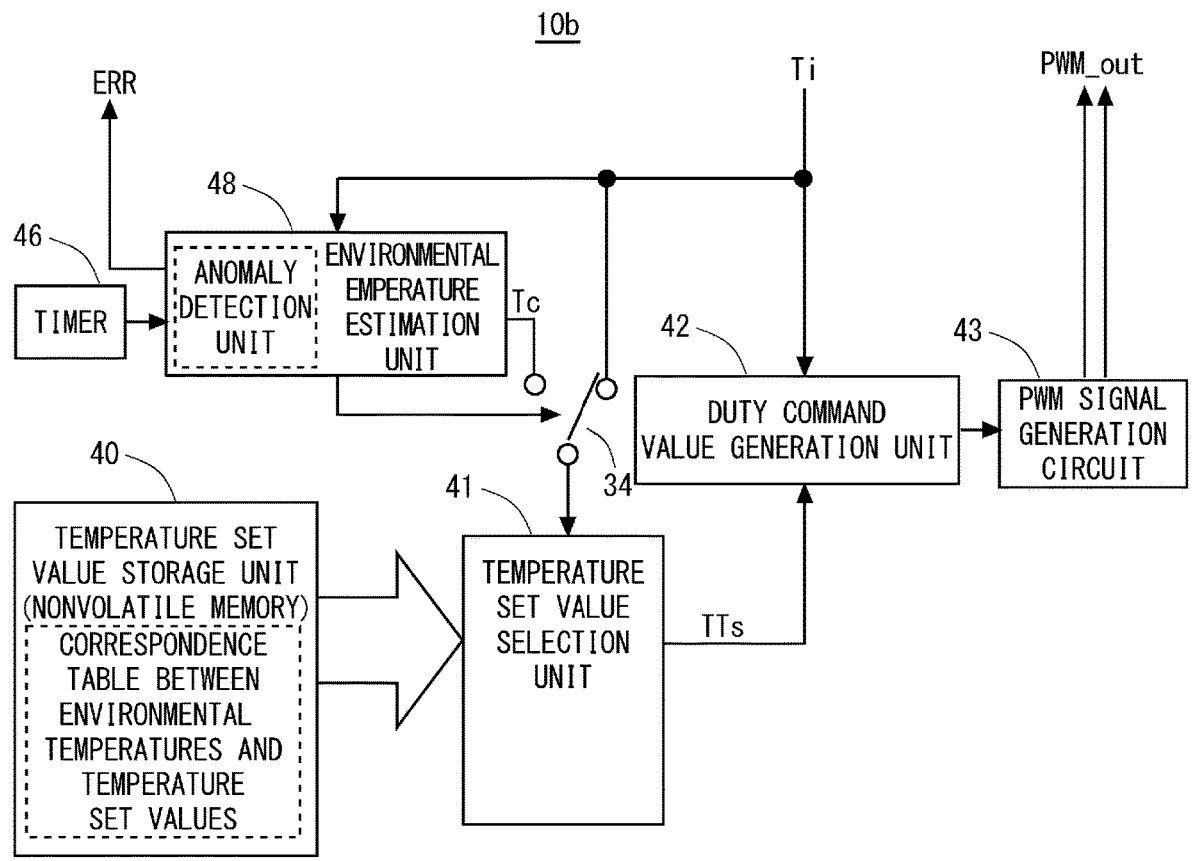
FIG. 14 is a block diagram of a temperature control unit according to a third embodiment.

In a third embodiment, a heater control unit (e.g., a heater control unit 10b), which is a modified example of the heater control unit 10 according to the first embodiment, will be described. FIG. 14 shows a block diagram of the heater control unit 10b according to the third embodiment. As shown in FIG. 14, the configuration of the heater control unit 10b according to the third embodiment is the same as that of the heater control unit 10 according to the first embodiment except that the environmental temperature estimation unit 45 is replaced with an environmental temperature estimation unit 48.

The environmental temperature estimation unit 48 is the same as the environmental temperature estimation unit 45 except that an anomaly detection unit is included. The anomaly detection unit outputs an error signal ERR that notifies the outside (e.g., a host system) of an anomaly when the rate of increase of the temperature falls outside the preset range. For example, if the rate of increase of the temperature is higher than the preset range, a short circuit may have occurred somewhere in the heating wire 23, and heat may have been abnormally generated due to a flow of overcur-rent. Further, if the rate of increase of the temperature is lower than the preset range, an anomaly in which a current does not flow through the heating wire 23 may have occurred somewhere.

By using the heater control unit 10b according to the third embodiment, it is possible to detect anomalies without using any additional components.

Fourth Embodiment

Figure 15:
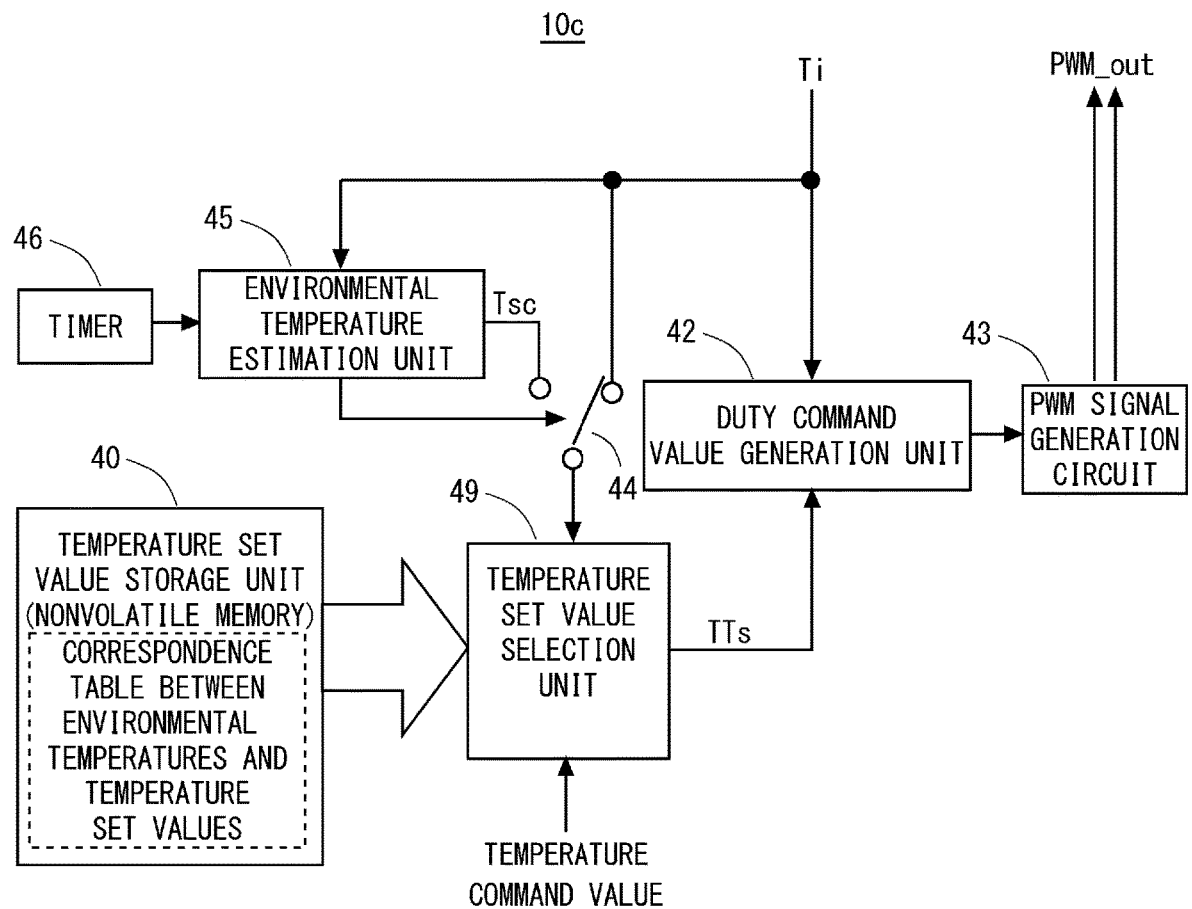
FIG. 15 is a block diagram of a temperature control unit according to a fourth embodiment.

In a fourth embodiment, a heater control unit (e.g., a heater control unit 10c), which is a modified example of the heater control unit 10 according to the first embodiment, will be described. FIG. 15 shows a block diagram of the heater control unit 10c according to the fourth embodiment. As shown in FIG. 15, the configuration of the heater control unit 10c according to the fourth embodiment is the same as that of the heater control unit 10 according to the first embodi-ment except that the temperature set value selection unit 41 is replaced with a temperature set value selection unit 49.

When the temperature command value given by the host system is changed, the temperature set value selection unit 49 adds an amount of change corresponding to the amount of change of the temperature command value to a target temperature that is set based on the estimated environmental temperature and updates the target temperature.

As described above, by using the heater control unit 10c according to the fourth embodiment, it is possible to change the temperature of the seat trim cover from the outside by changing the target temperature, based on an instruction from the host system.

Fifth Embodiment

In the aforementioned first embodiment, the processing for correcting control of the temperature, in which the influence of the estimated environmental temperature acquired by estimating the ambient temperature of the thermistor is taken into consideration, has been described. Further, as described above, the estimated environmental temperature is calculated based on the rate of increase of the temperature when the temperature of the heater 20 is increased. However, it has been found that the speed of increase of the temperature of the heater 20 is changed depending on electric power supplied to the heater 20. The electric power supplied to the heater 20 is changed depending on the output voltage of a battery. Therefore, in the fifth embodiment, an example will be described in which an error of the estimated environmental temperature that occurs in response to a change in the rate of increase of the temperature due to the electric power supplied to the heater 20 is corrected.

Figure 16:
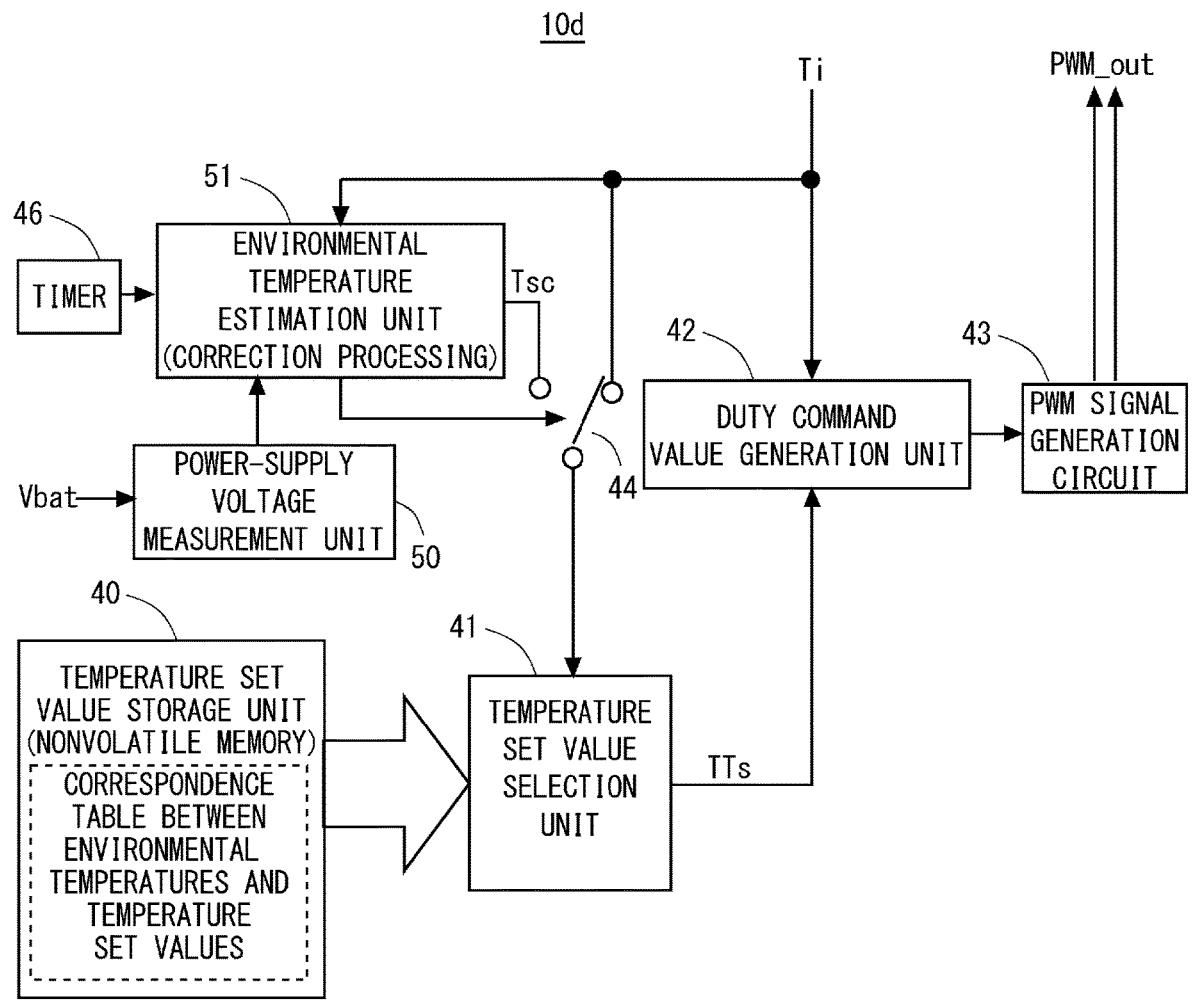
FIG. 16 is a block diagram of a temperature control unit according to a fifth embodiment.

First, FIG. 16 shows a block diagram of a heater control unit 10*d* according to the fifth embodiment. As shown in FIG. 16, the configuration of the heater control unit 10*d* according to the fifth embodiment is the same as that of the heater control unit 10 according to the first embodiment except that a power-supply voltage measurement unit 50 is included and the environmental temperature estimation unit 45 is replaced with an environmental temperature estimation unit 51.

The power-supply voltage measurement unit 50 converts a power-supply voltage (e.g., a battery voltage Vbat) of a power supply that supplies electric power to the thermistor 24 into a digital value and outputs the converted digital value. The environmental temperature estimation unit 51 corrects, based on the power supplied to the heater 20, the estimated environmental temperature calculated by the environmental temperature estimation unit 45 and calculates an estimated environmental temperature which the environmental temperature estimation unit 51 eventually outputs.

The processing for estimation performed by the environmental temperature estimation unit 51 is described below. FIG. 17 shows a table showing a relation between fluctuations in a power-supply voltage and the estimated environmental temperature. In FIG. 17, a table in the upper section shows a relation before the correction processing is performed between fluctuations in the power-supply voltage and the estimated environmental temperature, and a table in the lower section shows a relation after the correction processing is performed between fluctuations in the power-supply voltage and the estimated environmental temperature. Note that FIG. 17 is an example in which the ambient temperature of the thermistor is set to 20° C. and the estimated environmental temperature is calculated based on the rate of increase of the temperature acquired from the thermistor one minute from when the heater 20 starts to increase its temperature.

As shown in the upper section of FIG. 17, when the correction processing based on the electric power supplied to the heater 20 is not performed, the rate of increase of the temperature greatly varies as the power-supply voltage Vbat varies. Further, when the estimated environmental temperature is calculated based on the deviated rate of increase of the temperature, it is deviated from the original ambient temperature (e.g., 20° C.) and is reduced by 28.4° C. when the power-supply voltage Vbat is reduced from 12V to 9V. Further, when the power-supply voltage Vbat is increased from 12V to 16V, the estimated environmental temperature is deviated from the original ambient temperature (e.g., 20° C.) and is increased by 44° C.

On the other hand, as shown in the lower section of FIG. 17, when the correction processing based on the electric power supplied to the heater 20 is performed, the rate of increase of the temperature associated with the fluctuations in the power-supply voltage Vbat becomes low. This is because the environmental temperature estimation unit 51 corrects the rate of increase of the temperature based on the electric power supplied to the heater 20. Further, when the estimated environmental temperature is calculated based on the corrected rate of increase of the temperature, the amount of deviation from the original ambient temperature (e.g., 20° C.) is 1.4° C. even when the power-supply voltage Vbat is reduced from 12V to 9V, which is significantly smaller than that before a correction is made. Further, if the power-supply voltage Vbat is increased from 12V to 16V, the amount of deviation from the original ambient temperature (e.g., 20° C.) is 0.5° C., which is significantly smaller than that before a correction is made.

As described above, the environmental temperature estimation unit 51 corrects the measured rate of increase of the temperature based on the electric power supplied to the heater 20 and calculates the estimated environmental temperature based on the corrected rate of increase of the temperature, thereby enabling the deviation between the estimated environmental temperature and the actual temperature to be reduced. Therefore, the processing for a correction calculation performed by the environmental temperature estimation unit 51 will be described in detail.

First, electric power Ph supplied to the heater 20 is expressed by Expression (1), where a power-supply voltage supplied to the heater 20 is Vbat and a current supplied to the heater 20 is that.

$$Ph = Vbat \times Ibat \qquad (1)$$

It should be noted that as shown in FIG. 16, the heater control unit 10*d* does not include means for accurately measuring the current that. Therefore, that is expressed by Expression (2), where the standard resistance value of the heater 20 is Rh. Note that if the heater control unit 10*d* includes, for example, a function for measuring the current that or means for measuring the current that as one function of a power device constituting the PWM signal generation circuit 43, it is possible to obtain the electric power Ph supplied to the heater 20 based on Expression (1).

$$Ibat = Vbat/Rh \qquad (2)$$

Then, by substituting Expression (2) into Expression (1), Expression (3) can be obtained.

$$Ph = Vbat2/Rh \qquad (3)$$

Further, the environmental temperature estimation unit 51 uses the central value (e.g., the standard central value) of the power-supply voltage Vbat as a reference value, and holds in advance a power consumption Pb of the heater 20 when the power-supply voltage Vbat serving as the reference value is supplied to the heater 20. Then, based on Expression (4), the corrected rate CTr of increase of the temperature is calculated from the rate Tr of increase of the temperature obtained from the thermistor.

$$CTr = (Pb/Ph) \times Tr \qquad (4)$$

Assume a case in which the power-supply voltage is 9V in the example shown in FIG. 17 based on Expression (4). Note that in the example shown below, the power-supply voltage of 12V is used as a reference, and the electric power supplied to the heater 20 at 12V is 77 W. Further, when the rate of increase of the temperature (10.5° C./min) in FIG. 17 obtained at 9V before a correction is made is corrected, Expression (5) is obtained.

$$CTr = (77[W]/43.3[W]) \times 10.5[° C./min] = 18.6[° C./min] \qquad (5)$$

Then, by calculating the estimated environmental temperature based on the corrected rate of increase of the temperature calculated based on Expression (5), it is possible to reduce the deviation between the actual temperature and the estimated environmental temperature.

As described above, by using the heater control unit 10d according to the fifth embodiment, it is possible to correct the deviation of the estimated environmental temperature due to the fluctuations in the power-supply voltage and achieve a more accurate control of the temperature. In particular, in a battery mounted on an automobile, a large variation occurs in the output voltage, and therefore it is extremely important to correct the deviation of the estimated environmental temperature due to the variations in the power-supply voltage in order to maintain the accuracy of control.

Note that the present invention is not limited to the above embodiments and may be changed as appropriate without departing from the spirit of the present invention.

This application is based upon and claims the benefit of priority from Japanese patent application No. 2017-190197, filed on Sep. 29, 2017, the disclosure of which is incorporated herein in its entirety by reference.

REFERENCE SIGNS LIST

1 SEAT HEATER
10 HEATER CONTROL UNIT
20 HEATER
21 BASE MATERIAL
22 OPENING
23 HEATING WIRE
24 THERMISTOR
25 SEATING PART
26 OUTLET
30 SEAT SURFACE
31 SEAT CUSHIONING MATERIAL
32 SEAT TRIM COVER
33 BACKREST
40 TEMPERATURE SET VALUE STORAGE UNIT
41, 47, 49 TEMPERATURE SET VALUE SELECTION UNIT
42 DUTY COMMAND VALUE GENERATION UNIT
43 PWM SIGNAL GENERATION CIRCUIT
44 SWITCH
45, 51 ENVIRONMENTAL TEMPERATURE ESTIMATION UNIT
46 TIMER
48 ENVIRONMENTAL TEMPERATURE ESTIMATION UNIT
50 POWER-SUPPLY VOLTAGE MEASUREMENT UNIT
Tc ESTIMATED ENVIRONMENTAL TEMPERATURE
Ti DETECTED ENVIRONMENTAL TEMPERATURE
TTs TARGET TEMPERATURE SET VALUE

The invention claimed is:

1. A seat heater comprising:
a heater that is provided between a seat cushioning material and a seat trim cover and comprises a heating wire laid on a base material;
a temperature detection unit provided on the base material and in the vicinity of the heating wire of the heater, the temperature detection unit comprising a thermistor being positioned apart from where a seat occupant comes in contact with the seat; and
a temperature control unit configured to control a temperature of the heater so that it approaches a target temperature in accordance with a temperature detected by the temperature detection unit, wherein
the temperature control unit starts heating the heater at a target temperature corresponding to an initial temperature detected by the temperature detection unit at a start of heating the heater, calculates an estimated environmental temperature, which is an estimated value of a temperature around the temperature detection unit, based on a rate of increase of a temperature indicating an amount of change of the temperature detected by the temperature detection unit in a period after an elapse of a predetermined time from a start of heating the heater, and corrects the target temperature so that it becomes lower as the estimated environmental temperature becomes lower.

2. The seat heater according to claim 1, wherein the temperature control unit calculates the estimated environmental temperature based on a calculation formula created using a temperature detected by the temperature detection unit at the start of heating and an approximate straight line indicating a relation between an environmental temperature measured in advance and the rate of increase of the temperature.

3. The seat heater according to claim 1, wherein
the heater further comprises a seating part in which the heating wire is bended and laid on the base material, and an outlet through which the heating wire is drawn to the temperature control unit, and
the temperature detection unit is provided between the seating part and the outlet.

4. The seat heater according to claim 1, wherein the temperature control unit sets an estimated range of the estimated environmental temperature in advance, and controls the temperature of the heater at a preset target temperature when the estimated environmental temperature or the temperature detected by the temperature detection unit exceeds the estimated range.

5. The seat heater according to claim 1, wherein the temperature control unit comprises a previous value holding unit configured to hold an estimated environmental temperature calculated at a time of a previous start-up, and selects a set value that can reduce an initial acceleration period from either a previous temperature set value corresponding to a previous environmental temperature estimated value held by the previous value holding unit at the time of the start-up or a current temperature set value corresponding to the environmental temperature detected by the temperature detection unit at the time of the start-up, and uses the set value as a temperature set value at acceleration.

6. The seat heater according to claim 1, wherein the temperature control unit further comprises an anomaly detection unit configured to notify a host system of an anomaly when the rate of increase of the temperature falls outside a preset range.

7. The seat heater according to claim 1, wherein when a temperature command value given by a host system is changed, the temperature control unit adds an amount of change corresponding to an amount of change of the temperature command value to a target temperature that is set based on the estimated environmental temperature and updates the target temperature.

8. The seat heater according to claim 1, wherein the temperature control unit, based on a ratio between a heater power supplied to the heater in a period during which the rate of increase of the temperature is measured and a preset reference heater power, corrects the rate of increase of the temperature and calculates the estimated environmental temperature based on the corrected rate of increase of the temperature.

9. A temperature control method for a seat heater comprising a heater that is provided between a seat cushioning material and a seat trim cover and comprises a heating wire laid on a base material, and a temperature detection unit provided on the base material and in the vicinity of the heating wire of the heater, the temperature detection unit comprising a thermistor being positioned apart from where a seat occupant comes in contact with the seat, the temperature control method comprising:
- starting heating the heater at a target temperature corresponding to an initial temperature detected by the temperature detection unit at a start of heating the heater,
- acquiring a rate of increase of a temperature detected by the temperature detection unit in a period after an elapse of a predetermined time from the start of heating the heater;
- calculating, based on the rate of increase of the temperature, an estimated environmental temperature that is an estimated value of a temperature around the temperature detection unit;
- correcting the target temperature so that it becomes lower as the estimated environmental temperature becomes lower; and
- controlling a temperature of the heater by switching the target temperature of the heater to the corrected target temperature when the corrected target temperature is determined.

10. A non-transitory computer readable medium storing a temperature control program performed in a seat heater comprising a heater that is provided between a seat cushioning material and a seat trim cover and comprises a heating wire laid on a base material, a temperature detection unit provided on the base material and in the vicinity of the heating wire of the heater, the temperature detection unit comprising a thermistor being positioned apart from where a seat occupant comes in contact with the seat, and a temperature control unit configured to control a temperature of the heater, the temperature control program causing the temperature control unit to:
- start heating the heater at a target temperature corresponding to an initial temperature detected by the temperature detection unit at a start of heating the heater,
- acquire a rate of increase of a temperature detected by the temperature detection unit in a period after an elapse of a predetermined time from the start of heating the heater;
- calculate, based on the rate of increase of the temperature, an estimated environmental temperature that is an estimated value of a temperature around the temperature detection unit;
- correct the target temperature so that it becomes lower as the estimated environmental temperature becomes lower; and
- control a temperature of the heater by switching the target temperature of the heater to the corrected target temperature when the corrected target temperature is determined.

* * * * *